United States Patent [19]
Vannoy et al.

[11] Patent Number: 5,830,348
[45] Date of Patent: Nov. 3, 1998

[54] FUEL FILTER MODULE WITH INTEGRAL REGULATOR

[75] Inventors: Christopher T. Vannoy, Williamsburg; James A. Wynn, Jr., Virginia Beach, both of Va.

[73] Assignee: Siemens Automotive Corporation, Auburn Hills, Mich.

[21] Appl. No.: 818,861

[22] Filed: Mar. 17, 1997

[51] Int. Cl.⁶ .................................................. B01D 35/02
[52] U.S. Cl. .......................... 210/109; 210/137; 210/428; 210/429; 210/446; 210/450
[58] Field of Search .................... 210/109, 137, 210/196, 428–432, 446, 450, 130, 136, 436, 443, 448, 453, 116, 117; 137/549

[56] References Cited

U.S. PATENT DOCUMENTS 4,617,116 10/1986 Seiler .
5,078,167 1/1992 Brandt et al. .
5,195,494 3/1993 Tuckey .
5,433,241 7/1995 Robinson .
5,533,478 7/1996 Robinson .
5,584,318 12/1996 Brandt .

FOREIGN PATENT DOCUMENTS 2-223667 9/1990 Japan ...................................... 210/446

*Primary Examiner*—Matthew O. Savage

[57] ABSTRACT

The fuel filter/regulator assembly comprises a cylindrical body open at one end and closed at its opposite end by an annular wall having a pocket for receiving the regulator. The annular fuel filter is received in the body and has an inner end cap configured to bear against and receive an upper portion of the regulator. A further end cap closes the open end of the body and bears against the fuel filter element. A fuel inlet is provided and all components of the housing are formed of stainless steel. In another form, a wave spring is employed to accommodate stack-up tolerances of the fuel filter.

16 Claims, 7 Drawing Sheets

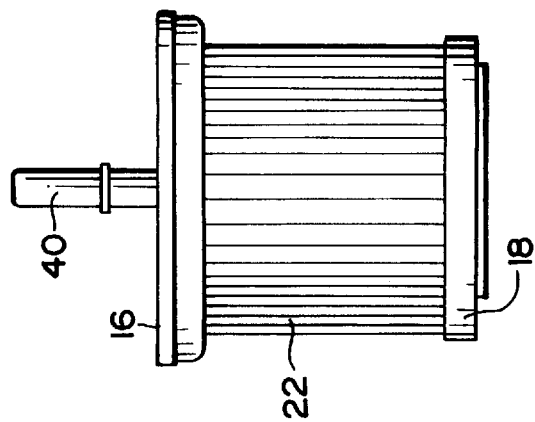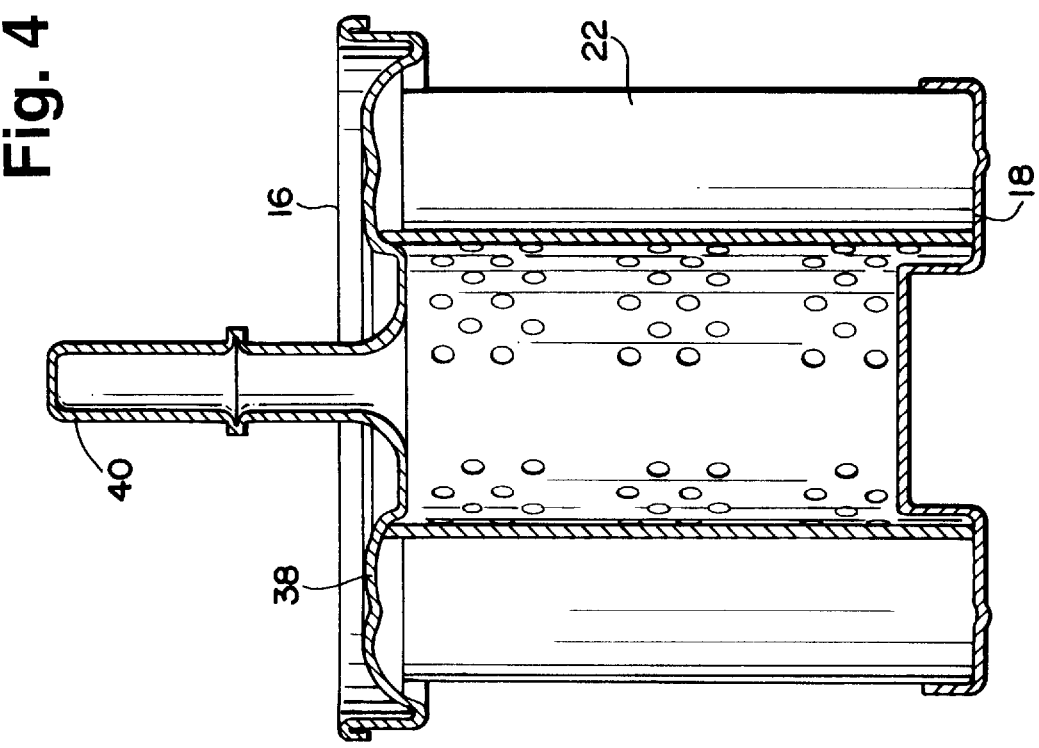

FUEL FILTER MODULE WITH INTEGRAL REGULATOR

TECHNICAL FIELD

The present invention relates to a fuel filter and regulator combined into a single assembly mounted to a vehicle for fuel pressure filtration and regulation and particularly to a fuel filter module having an integral regulator pocket for receiving the regulator within the fuel filter housing to afford regulated flow of filtered fuel to a vehicle engine.

BACKGROUND

With the advent of port fuel injection, fuel systems have required greater pressure control and filtration as fuel is delivered to the fuel injectors. In certain prior fuel supply systems, the pressure regulator is mounted integrally to the fuel rail and the filter is located remotely on the underside of the vehicle. Consequently, the fuel filter and regulator act independently, with the further disadvantages that two discrete components as well as a return line from the fuel rail to the fuel tank to deliver regulator bypass flow are required.

In recent years, a pressure regulator and fuel filter have been combined into a single component mounted directly in the fuel pump module housing. The fuel pump module housing resides in the fuel tank. Consequently, a disadvantage of that system is that should the filter or regulator need replacement, the fuel tank must be drained and removed at substantial expense to replace the fuel filter/regulator assembly.

Additionally, prior designs have utilized plastics as the assembly material. Plastics are not as durable or resistant to different fuel types and temperature fluctuations. Further, in past designs, the integral flow-through regulator design required change as the fuel filter area and capacity varied by engine type. Moreover, other designs had substantial complexity, significant piece part counts and high assembly costs.

DISCLOSURE OF THE INVENTION

In accordance with the present invention, there is provided an integral fuel filter and regulator module or assembly which minimizes or eliminates the foregoing problems associated with prior fuel filters and regulators, including those in which the functions of pressure regulation and fuel filtration have been combined into a single module or assembly. The present invention addresses those problems by employing a unique design housing both the fuel pressure regulator and the fuel filter in a single assembly in a unique combination and which assembly can be mounted to the vehicle for ready access and service. Moreover, the regulator is an integral component of the assembly. Hence, fuel system complexity is reduced and line routing is minimized and simplified. The assembly of the present invention is also formed from stainless steel components which afford protection against the combination of stress, corrosive fuels and harsh temperatures. Also, the fuel filter area and capacity which vary by engine type may be varied without changing the integral flow through regulator design. That is, in the present design, only the length of the overall design is modified to accommodate greater or less fuel filter areas. The regulator may be manufactured as an integral part separate from the fuel filter assembly, affording capability for mass production to accommodate a wide range of engine applications. Further, the regulator spring is readily modified in the regulator assembly apart from the filter to enable separate fuel pressures in the same fuel filter arrangement. Complexity, piece part counts and assembly costs are also reduced in the filter module with integral regulator according to the present invention.

More particularly, the assembly of the present invention includes a cylindrical body having an open end for receiving a fuel filter and a closed end having an integral pocket or cup projecting therefrom for receiving a regulator. When the fuel filter is disposed in the cylindrical body, a first end cap closes the open end of the cylindrical body overlying the fuel filter, thereby capturing the filter within the body. A second end cap within the cylindrical body spaced slightly inwardly from the closed end of the body provides a seat for the filter, as well as for the regulator. In this fashion, the regulator is captured between the filter and the outer end cap, simplifying assembly. A fuel inlet is integrally formed on the closed end of the cylindrical body for receiving fuel and passing that fuel through the filter to an outlet. The closed end pocket also includes a fuel bypass outlet. Consequently, it will be seen that the combined fuel filter and regulator assembly comprises essentially a four-part construction (excluding the filter and regulator per se) which simplifies manufacture and reduces costs. Further, the regulator may be readily sealed to the internal or second end cap and the pocket of the cylindrical body by the use of conventional O-ring seals.

One of the features of the present invention resides in the ability to use a fuel filter comprising a folded paper filter cartridge between two metal end caps using a temperature-activated adhesive (Plastisol). While this decreases costs, there is a length variation in the paper cartridge which can exceed tolerances. Because the length of the fuel filter cartridge varies widely, there is a stack-up of tolerances which must be accommodated and which must also account for the need to seal the regulator against the fuel filter cartridge to eliminate contaminated fuel from bypassing the filter. To accomplish this, a wave spring is disposed between the closed end of the cylindrical body and a radial flange on the regulator for biasing the regulator toward the open end of the cylindrical body. With the regulator sealed to the second internal end cap as well as within the pocket, the compression of the spring accommodates the variations in the end of the internal filter end cap. Thus, the spring affords the assembly an allowance for stacked-up tolerances in the fuel filter cartridge in a most inexpensive manner.

In a preferred embodiment according to the present invention, there is provided a fuel filter module with integral regulator, comprising an outer, generally cylindrical body open at a first end and closed at a second end, the second end having a reduced diameter cup projecting therefrom with an outlet at an end of the cup remote from the second end, a regulator disposed in the cup and projecting from the second end toward the first end, a fuel filter within the cylindrical body, an end cap for closing the open end of the cylindrical body and overlying the fuel filter and a second end cap within the cylindrical body between the regulator and the filter for engaging the filter whereby the filter is supported in the body between the first and second end caps and a fuel inlet through the body for flowing fuel to the filter.

In a further preferred embodiment according to the present invention, there is provided a fuel filter module with integral regulator, comprising an outer body open at a first end and closed at a second opposite end, the second end having a seat and an outlet at an end of the seat remote from the second end, a regulator disposed in the seat, a fuel filter within the body, an end cap for closing the open end of the body and overlying the fuel filter, a second end cap within the body between the regulator and the filter for engaging the filter and the regulator whereby the filter is supported in the body between the first and second end caps and the regulator is retained between the seat and the second end cap, a fuel inlet through the body for flowing fuel to the filter and a fuel outlet for flowing filtered fuel from the module.

Accordingly, it is a primary object of the present invention to provide a low-cost, minimum piece part count combined filter and regulator module for regulating flow of filtered fuel to the engine of a vehicle.

BRIEF DESCRIPTION OF THE DRAWINGS

FIG. 4 is a cross-sectional view of the fuel filter subassembly illustrating the fuel filter with opposite end caps applied;

FIG. 5 is a side elevational view of the fuel filter on a reduced scale;

BEST MODE FOR CARRYING OUT THE INVENTION

Figure 1:
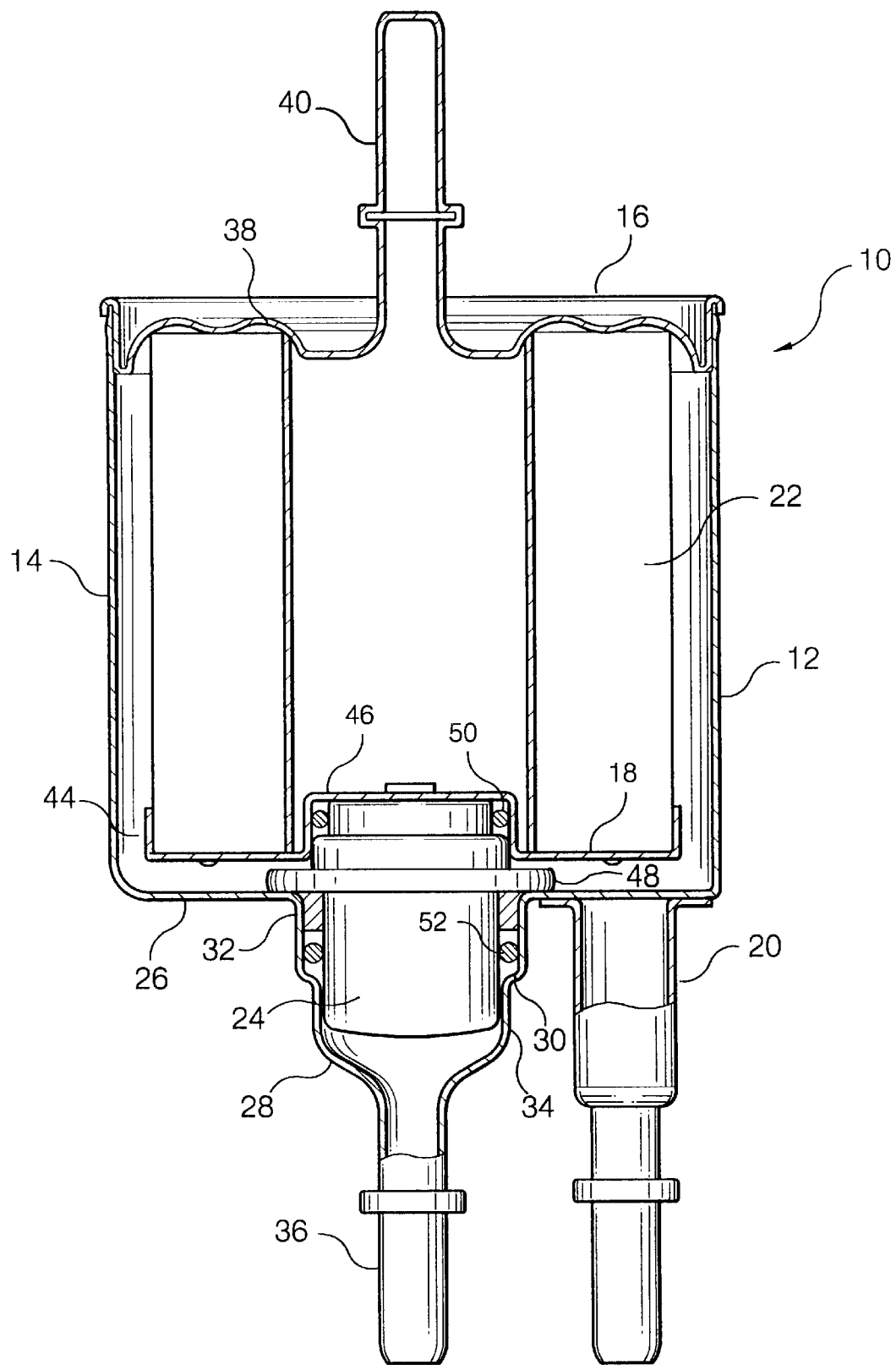
FIG. 1 is a cross-sectional view of a fuel filter and regulator assembly according to the present invention.

Referring now to the drawings, particularly to FIG. 1, there is illustrated a fuel filter and regulator assembly according to the present invention and generally designated 10. Assembly 10 includes a housing 12 essentially formed of four component parts: a cylindrical body 14, a first end cap 16, a second end cap 18 and a fuel inlet 20. Within housing 12, there is provided a conventional fuel filter 22. Filter 22 is in the form of an annulus formed of corrugations of paper, per se forms no part of the present invention and therefore further description of the filter itself is not necessary. Additionally, a conventional pressure regulator 24 is disposed within the housing 12 in a unique manner, as will become clear from the ensuing description.

Figure 2:
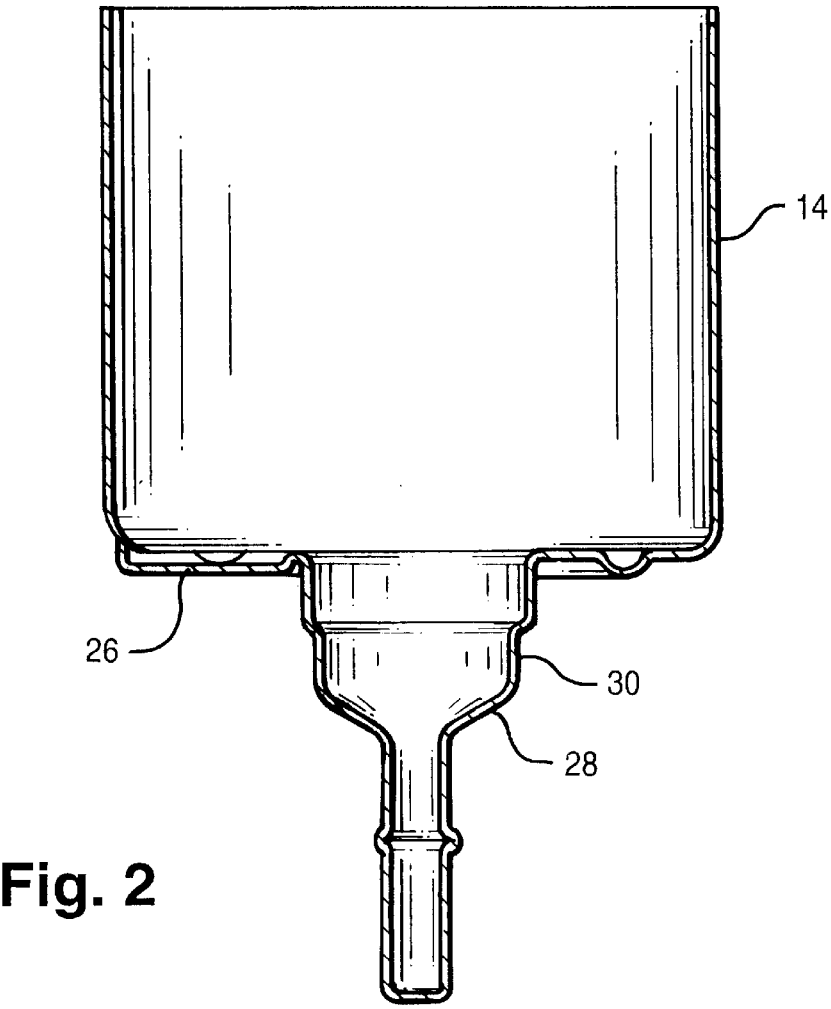
FIG. 2 is a view similar to FIG. 1 on a reduced scale illustrating the cylindrical body which forms a first component part of the assembly of FIG. 1.
Figure 3:
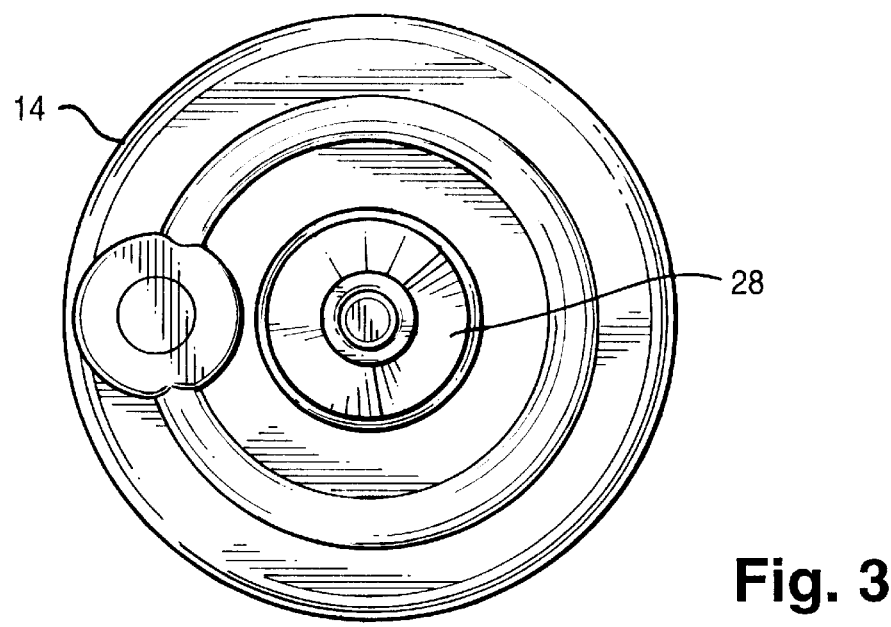
FIG. 3 is an end elevational view of the component part illustrated in FIG. 2.
Figure 6:
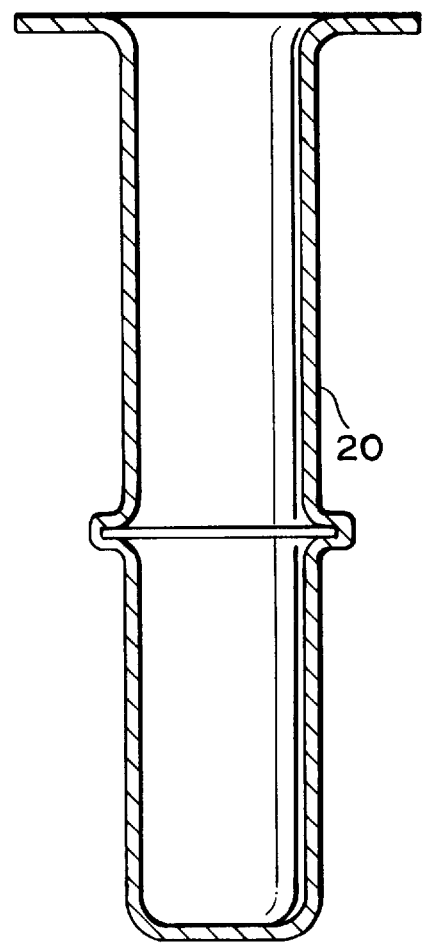
FIG. 6 is an enlarged cross-sectional view of the fuel inlet secured to the underside of the assembly of FIG. 1.
Figure 7:
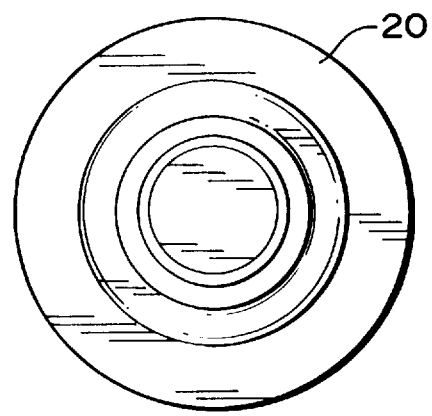
FIG. 7 is an end elevational view thereoef.

The first component part, i.e., the cylindrical body 14, similarly as the other four component parts, is formed of stainless steel. Particularly, the cylindrical body 14 includes a cylindrical outer side wall terminating in an open end, i.e., the upper end as illustrated in FIG. 1. Body 14 is closed at its opposite end by a wall 26. The wall includes a seat for receiving and mounting the regulator 24. Preferably, the seat comprises a pocket or a cup 28 formed on the axis of the cylindrical body 14 and which pocket or cup 28 projects from the end wall 26. The pocket or cup 28 has a step 30 whereby the initial cylindrical portion 32 of the pocket 28 is larger in diameter than the integrally formed extension 34 of the pocket 28. The pocket 28 terminates at its lower end in a fitting 36 for coupling to a return fuel line. From a review of FIG. 1 and also FIG. 2, it will be appreciated that the first part, i.e., the cylindrical body 14, comprises a single part and which not only forms end and side walls for the filter 22 but also a receptacle for regulator 24.

In FIG. 1, the upper end of the housing 12 includes a second component, i.e., a first end cap 38. End cap 38 is formed of an integral stamping which retains the pressure regulator and filter together, as discussed below. End cap 38 has a quick connect male fitting formed axially of the assembly, affording an outlet port 40 for fuel flow to a fuel rail, not shown. The end cap 38 also serves as one end for the fuel filter 22. To secure the end cap 38 to the cylindrical body 14, a crimp or laser weld may be formed at the juncture of the end cap 38 and body 14, a crimp being illustrated.

Another component of the assembly comprises a quick connect male fitting 20 which may be attached at one end to the annular wall 26 of the cylindrical body 14, for example, by welding or brazing. Component 20 is formed from either tubing or as a progressively stamped component. This simplifies the complexity of the cylindrical body which requires two outlet ports, the component 20 acting as the inlet to the fuel filter regulator assembly from the fuel pump.

The final component 18 of the assembly comprises the second end cap. It will be appreciated that the fuel filter element may be captured between the end elements 16 and 18 by using an adhesive (Plastisol). The second end cap 18 has an annular flange 44 about its outer diameter for enclosing the lower end of the fuel filter element 22. Second end cap 18 also includes an inward projection 46 forming a cylindrical recess for receiving the upper end of the pressure regulator 24. In FIG. 1, the pressure regulator has a radially outwardly projecting flange 48 located between the annular wall 26 of body 14 and the second end cap 18. Additionally, O-ring seals 50 and 52 are disposed between the regulator and the central recess 46 of the end cap 18 and the pocket 28, respectively. Thus, the second end cap 18 and pocket 28 seal the regulator to ensure leak-free regulation of only filtered fuel. When the assembly is fabricated, the regulator 24 is placed into the cylindrical pocket 28 using the O-ring 52 to seal the interface. The filter 22 between the end caps 16 and 18 is then installed over the regulator. The regulator mates into the inwardly extending recess 46 of the second end cap component 18 and the end cap 16 mates with the open end of the cylindrical body 14. The end cap 16 is then laser welded or crimped to the body 14, capturing the regulator 24 on axis between the second end cap and the annular wall 26 of body 14. Thus, it will be seen that by employing essentially four component parts which may be readily fabricated and coupled one to the other, a very simple, robust fuel filter/regulator assembly is provided.

Figure 8:
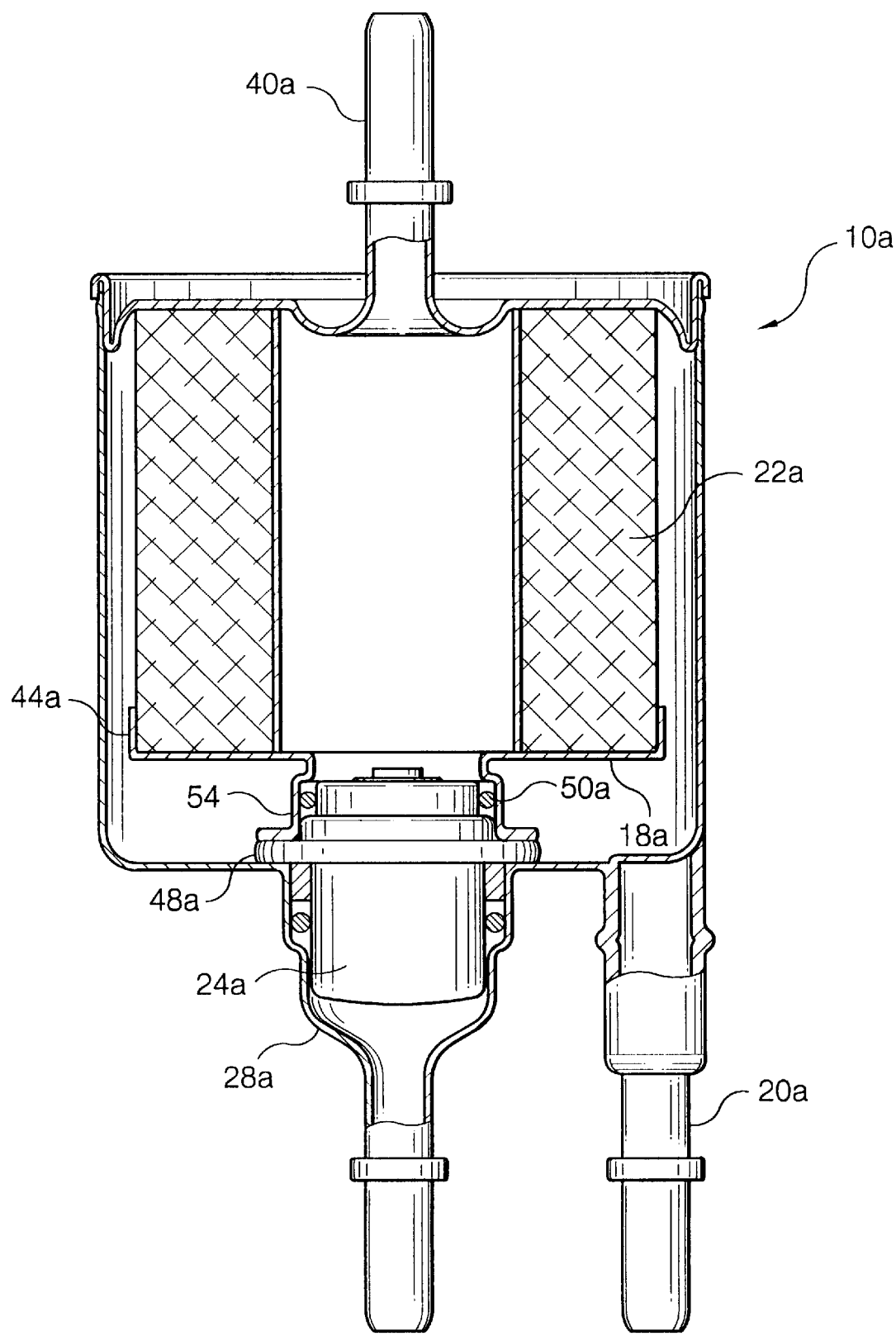
FIG. 8 is a view similar to FIG. 1 illustrating a further embodiment of the present invention.
Figure 9:
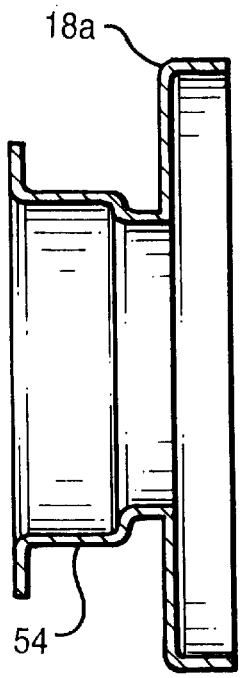
FIG. 9 is a cross-sectional view of a second end cap used in the embodiment illustrated in FIG. 8.
Figure 12:
FIG. 12 is a cross-sectional view of the wave spring employed in the embodiment of FIG. 11.
Figure 10:
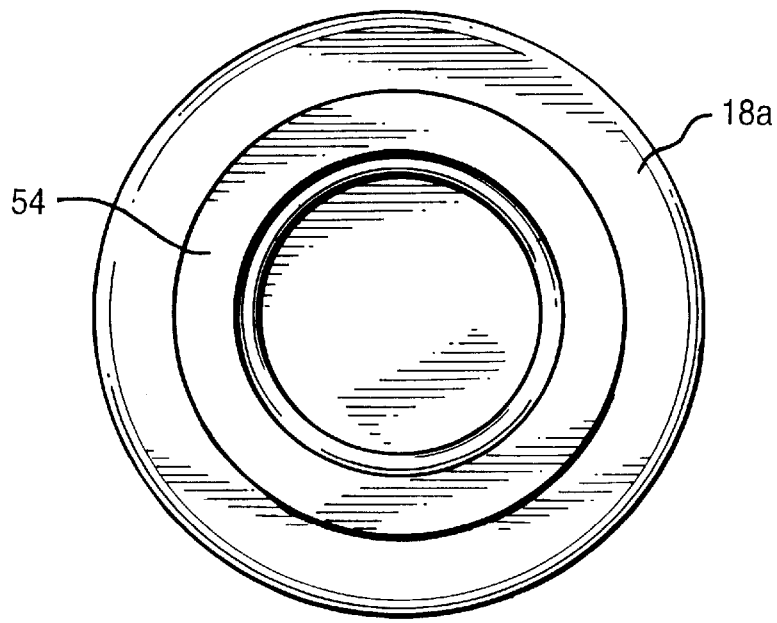
FIG. 10 is an end elevational view of the second end cap of FIG. 9.
Figure 11:
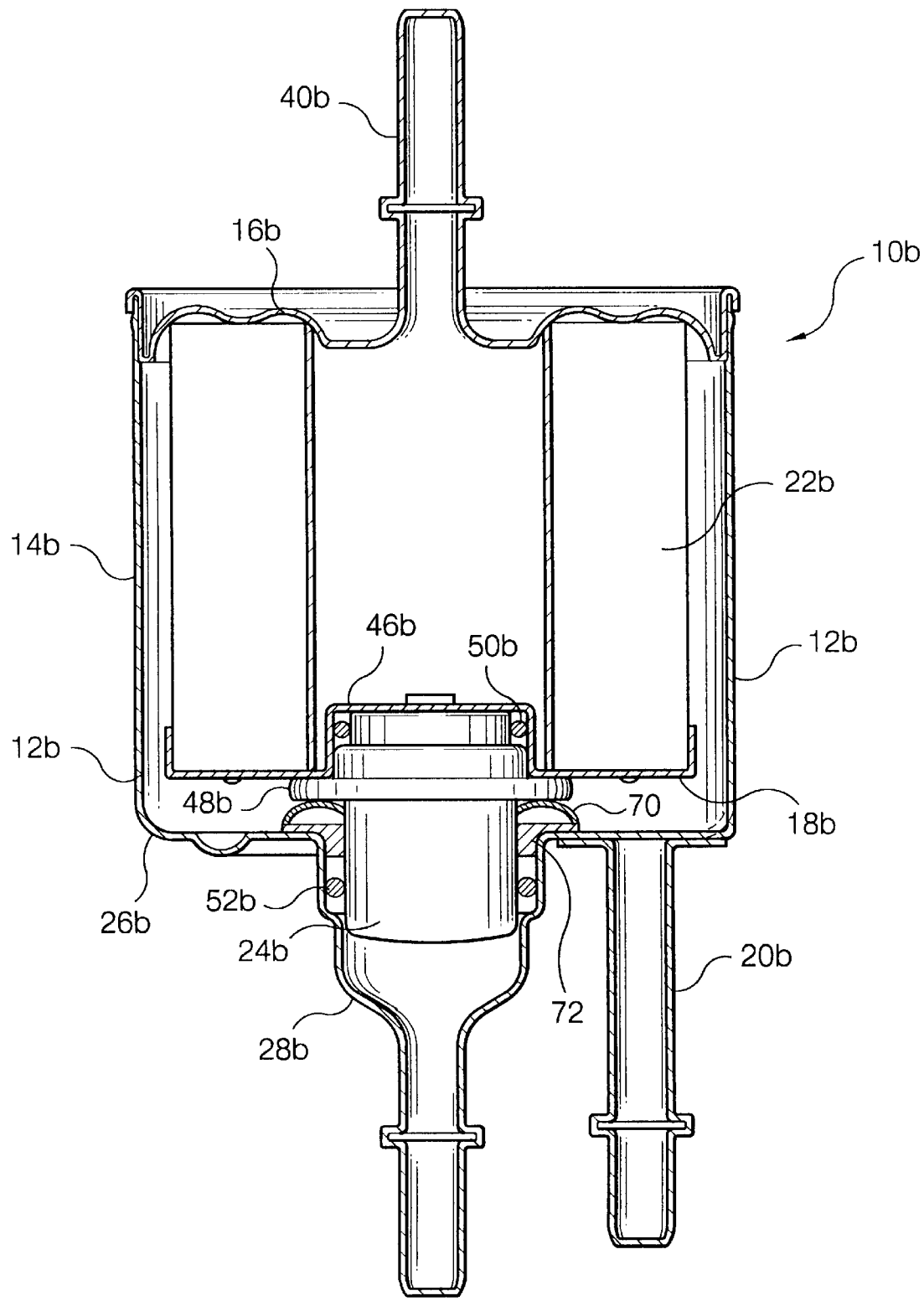
FIG. 11 is a cross-sectional view similar to FIG. 1 of a further embodiment of an assembly according to the present invention.

Referring now to the embodiment of FIGS. 8–10, like reference numerals apply to like parts, followed by the letter suffix "a." The fuel filter/regulator assembly of FIGS. 8–10 is similar to the assembly of FIG. 1, except that it is of a somewhat smaller filter size and has a different end cap. The component parts 14a, 16a and 20a remain essentially the same as previously described. However, the second end cap 18a accommodates the reduced length of the fuel filter. In this form, the end 18a has an outer flange 44a for encapsulating the lower end of the filter 22a. Instead of an inwardly directed recess 46 as in the first embodiment, the component 18a has an axially projecting, integrally formed sleeve 54 which is received about the upper end portion of the regulator 24a. The fitting 54 is stepped radially outwardly to receive an O-ring seal 50a sealing the regulator to the component 18a. The outer end of the fitting 54 bears against the flange 48a of the regulator 24a.

Referring now to the third and final embodiment of the present invention, wherein like reference numerals apply to like parts followed by the suffix "b," there is illustrated a fuel filter/regulator assembly 10b which greatly simplifies packaging and assembly. There is a wide tolerance due to the assembly of the folded paper element of the filter which is adhered between the two metal end caps using a temperature-activated adhesive. The variations in the length of the paper fuel filter can exceed plus or minus 1 millimeter. Because the length of the fuel filter cartridge varies widely, it poses a problem when trying to capture the regulator between the cartridge and the filter housing. The problem is exacerbated by the need to seal the regulator against the fuel filter cartridge to eliminate contaminated fuel from bypassing the filter and to seal the regulator against the filter housing to seal high pressure and low pressure.

To accommodate the stack-up of tolerances between the fuel filter cartridge and the wall 26b of the assembly 10b, there is provided a wave spring 70 disposed between a grommet 72 in the pocket 28b of the body and the underside of the radial flange 48b of regulator 24b. The wave spring 70 is annular in plan form and includes peaks and valleys in the form of corrugations about the circumference of the spring. The wave spring therefore has a play in excess of the variations in length of the fuel filter and hence can take up the differences in tolerances. Additionally, the grommet or spacer 72 provides a secondary function of acting as a positive stop for any travel of the O-ring 52b in the pocket 28b. The step in the pocket 28b provides the stop in the opposite direction. Thus, the wave spring 70 provides the assembly with substantial allowance for stack-up tolerances in the fuel filter cartridge, employing an inexpensive and durable component to accomplish that purpose.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fuel filter module with integral regulator, comprising:
   an outer, generally cylindrical body open at a first end and closed at a second end, said second end having a reduced diameter cup projecting therefrom with an outlet at an end of the cup remote from said second end;
   a regulator disposed in said cup and projecting from said second end toward said first end, wherein said regulator controls a flow of fuel through said outlet to maintain fuel pressure within said body below a predetermined level;
   a fuel filter within said cylindrical body;
   an end cap for closing said open end of said cylindrical body and overlying said fuel filter and a second end cap within said cylindrical body between said regulator and said filter for engaging said filter whereby the filter is supported in said body between said first and second end caps;
   said second end cap being spaced from said cylindrical body and having a recess for receiving a portion of said regulator projecting from said second end of said body, said second end cap forming a seat on one side thereof for said filter and said recess forming a seat for said regulator portion on an opposite side of said second end caps; and
   a fuel inlet through said body for flowing fuel to said filter.

2. A module according to claim 1 including seals in said cup and said recess sealing said regulator to said body and said second end cap, respectively.

3. A module according to claim 1 wherein said first end cap has a fuel outlet for flowing fuel filtered by said fuel filter from said module.

4. A module according to claim 1 wherein said cylindrical body has an axis, said cup and said regulator lying on said axis.

5. A module according to claim 1 wherein said cylindrical body has an axis, said cup and said regulator lying on said axis, and seals in said cup and said recess sealing said regulator to said body and said second end cap, respectively.

6. A module according to claim 5 wherein said first end cap has a fuel outlet for flowing fuel filtered by said fuel filter from said module.

7. A fuel filter module with integral regulator, comprising:
   an outer, generally cylindrical body open at a first end and closed at a second end, said second end having a reduced diameter cup projecting therefrom with an outlet at an end of the cup remote from said second end;
   a regulator disposed in said cup and projecting from said second end toward said first end, wherein said regulator controls a flow of fuel through said outlet to maintain fuel pressure within said body below a predetermined level;
   a fuel filter within said cylindrical body;
   an end cap for closing said open end of said cylindrical body and overlying said fuel filter and a second end cap within said cylindrical body between said regulator and said filter for engaging said filter whereby the filter is supported in said body between said first and second end caps;
   a fuel inlet through said body for flowing fuel to said filter; and
   a spring between said second end of said body and said regulator for biasing said regulator toward the open end of said cylindrical body.

8. A module according to claim 7 wherein said spring comprises a wave spring.

9. A module according to claim 7 wherein said second end cap is spaced from said second end of said cylindrical body and has a recess for receiving a portion of said regulator projecting from said second end of said body, seals in said cup and said recess sealing said regulator to said body and said second end cap, respectively.

10. A module according to claim 9 wherein said cylindrical body has an axis, said cup and said regulator lying on said axis.

11. A module according to claim 10 wherein said first end cap has a fuel outlet along said axis for flowing fuel filtered by said fuel filter from said module.

12. A fuel filter module with integral regulator, comprising:
   an outer body open at a first end and closed at a second opposite end, said second end having a seat and a first outlet at an end of said seat remote from said second end;
   a regulator disposed in said seat, wherein said regulator controls a flow of fuel through said first outlet to maintain fuel pressure within said body below a predetermined level;

a fuel filter within said body;

an end cap for closing said open end of said body and overlying said fuel filter;

a second end cap within said body between said regulator and said filter for engaging said filter and said regulator whereby the filter is supported in said body between said first and second end caps and said regulator is retained between said seat and said second end cap;

said second end cap being spaced from said body, a portion of said regulator projecting from said second end of said body, and a recess in said second end cap for receiving said regulator portion, said second end cap forming a seat on one side thereof for said filter and said recess forming a seat for said regulator portion on an opposite side of said second end cap;

a fuel inlet through said body for flowing fuel to said filter; and a second fuel outlet for flowing fuel filtered by said fuel filter from said module.

13. A module according to claim 12 including seals in said seat in said second end and said recess sealing said regulator to said body and said second end cap, respectively.

14. A module according to claim 12 wherein said first end cap mounts said second fuel outlet for flowing fuel filtered by said fuel filter from said module.

15. A fuel filter module with integral regulator, comprising:

an outer body open at a first end and closed at a second opposite end, said second end having a seat and a first outlet at an end of said seat remote from said second end;

a regulator disposed in said seat, wherein said regulator controls a flow of fuel through said first outlet to maintain fuel pressure within said body below a predetermined level;

a fuel filter within said body;

an end cap for closing said open end of said body and overlying said fuel filter;

a second end cap within said body between said regulator and said filter for engaging said filter and said regulator whereby the filter is supported in said body between said first and second end caps and said regulator is retained between said seat and said second end cap;

a fuel inlet through said body for flowing fuel to said filter;

second fuel outlet for flowing fuel filtered by said fuel filter from said module; and a spring between said second end of said body and said regulator for biasing said regulator toward the open end of said body.

16. A module according to claim 15 wherein said spring comprises a wave spring.

* * * * *